United States Patent [19]

Dunn

[11] Patent Number: 4,559,768
[45] Date of Patent: Dec. 24, 1985

[54] POWER-DRIVEN LAWNMOWER

[76] Inventor: Robert M. Dunn, 506 Queen St., Alexandria, Va. 22314

[21] Appl. No.: 614,227

[22] Filed: May 25, 1984

[51] Int. Cl.[4] .................. A01D 34/03; A01D 35/262; A01D 55/32
[52] U.S. Cl. ..................................... 56/16.9; 56/17.1; 56/17.2
[58] Field of Search ...................... 56/10.5, 10.3, 16.9, 56/255, 11.9, 11.6, 17.5, 17.2, 17.1

[56] References Cited

U.S. PATENT DOCUMENTS

| | | | |
|---|---|---|---|
| 2,203,198 | 6/1940 | Junge | 56/255 |
| 2,329,185 | 9/1943 | Coddington | 56/255 |
| 2,466,620 | 4/1949 | Swift et al. | 56/11.6 |
| 2,476,394 | 7/1949 | Webb et al. | 56/17.1 |
| 2,484,201 | 10/1949 | Winchell | 56/17.1 |
| 2,513,685 | 7/1950 | Smith et al. | 56/11.6 |
| 2,551,817 | 5/1951 | Taylor | 56/255 |
| 2,565,044 | 8/1951 | Puls | 56/255 |
| 2,585,405 | 2/1952 | Reiter | 56/11.6 |
| 2,597,735 | 5/1952 | Jepson | 56/10.5 |
| 2,752,699 | 7/1956 | Gustafson | 56/255 |
| 2,790,292 | 4/1957 | Trecker | 56/16.9 |
| 2,882,977 | 4/1959 | Smith et al. | 56/17.1 |
| 3,151,563 | 10/1964 | Lita et al. | 56/16.8 |
| 3,212,244 | 10/1965 | Wilgus | 56/11.9 |
| 3,599,406 | 8/1971 | Akgulian et al. | 56/17.2 |
| 3,789,591 | 2/1974 | Emery | 56/16.9 |
| 3,813,190 | 5/1974 | Keating | 56/16.9 |
| 4,084,395 | 4/1978 | Nannen | 56/17.5 |
| 4,112,656 | 9/1978 | Ranko et al. | 56/16.9 |
| 4,242,855 | 1/1981 | Beaver, Jr. | 56/16.9 |
| 4,351,143 | 9/1982 | Lessig, III | 56/17.5 |

FOREIGN PATENT DOCUMENTS

| | | | |
|---|---|---|---|
| 348059 | 4/1931 | United Kingdom | 56/16.9 |
| 845169 | 8/1960 | United Kingdom | 56/17.1 |

Primary Examiner—Paul J. Hirsch
Attorney, Agent, or Firm—Burns, Doane, Swecker & Mathis

[57] ABSTRACT

A power driven lawnmower of the walk-behind type has its ground support wheels all disposed behind the blade travel path and to the side walls of the lawnmower which straddle the blade, to enable the blade to be maneuvered closer to upstanding objects such as walls. The lawnmower has a gasoline powered engine and an electric generator which is driven by the engine. The generator includes an electrical outlet socket capable of receiving a multi-pronged plug of an external electrically driven implement. Vertical height adjustment of the blade is achieved by an extension of the blade shaft which extends upwardly through a sleeve. Holes in the sleeve and shaft extension are suitably aligned and affixed to provide for the height adjustment. During such adjustment, the lawnmower may be positioned atop a platform which carries a slot for receiving the blade to prevent rotation of the blade as the shaft nut is unscrewed.

29 Claims, 11 Drawing Figures

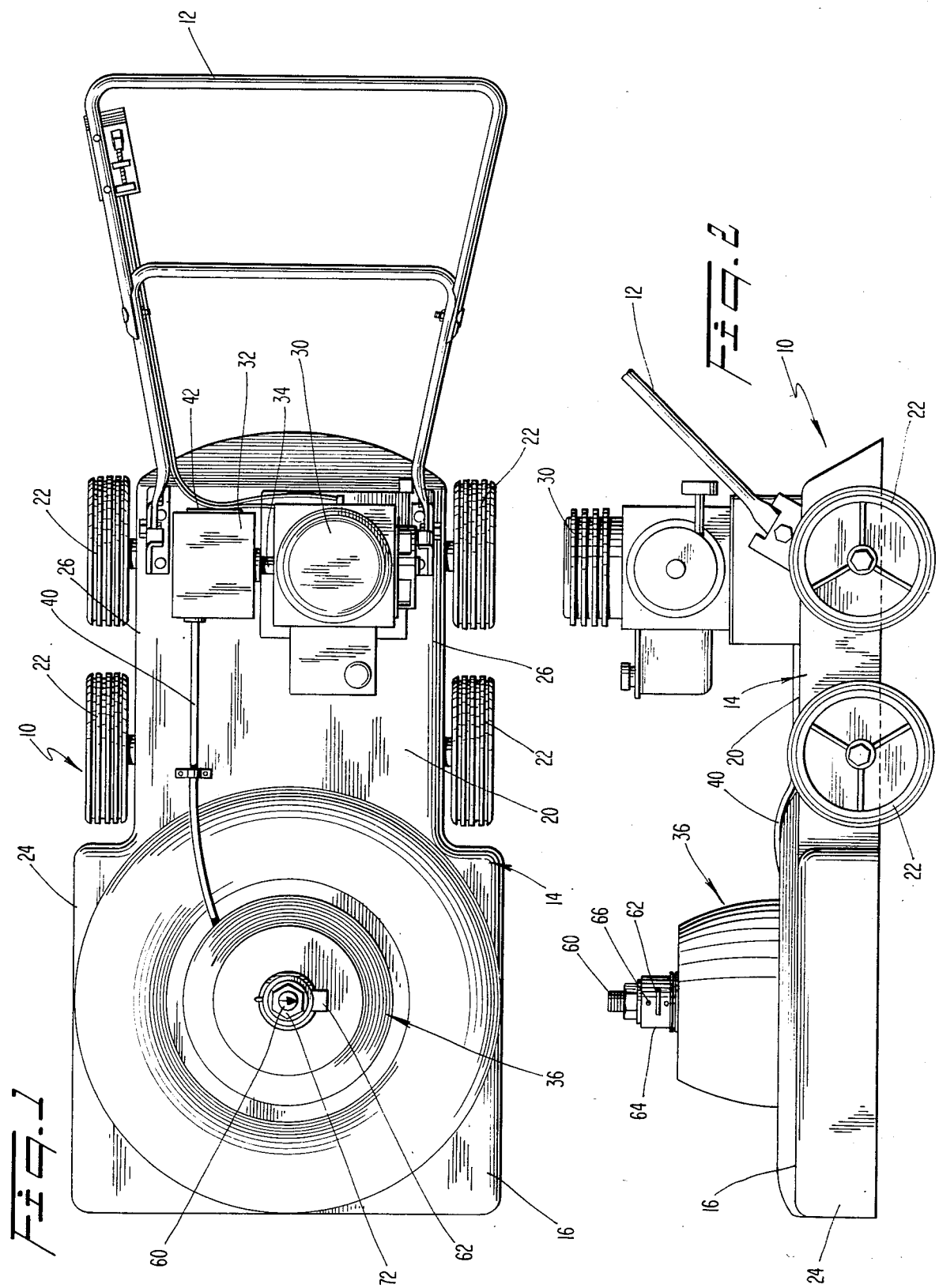

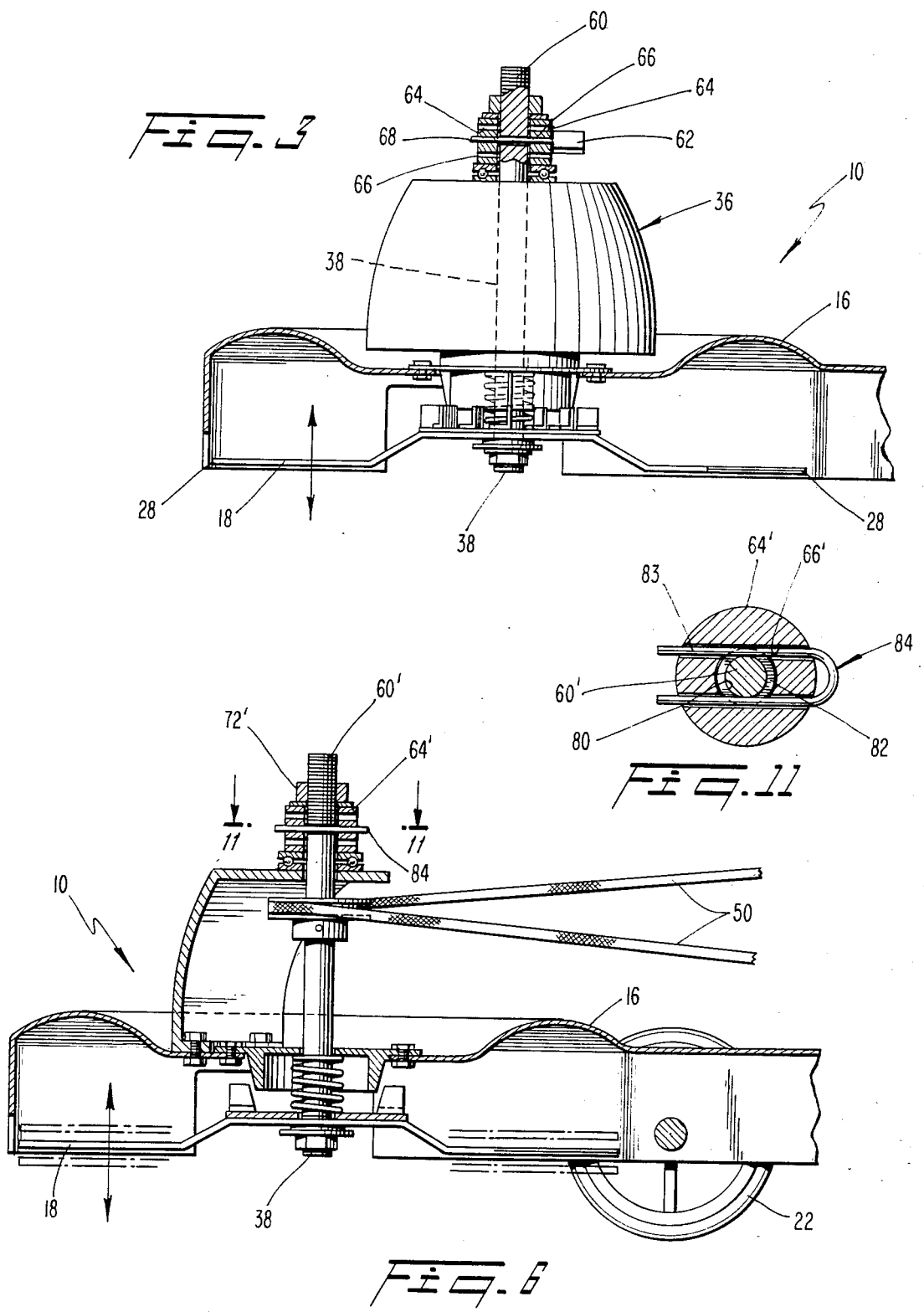

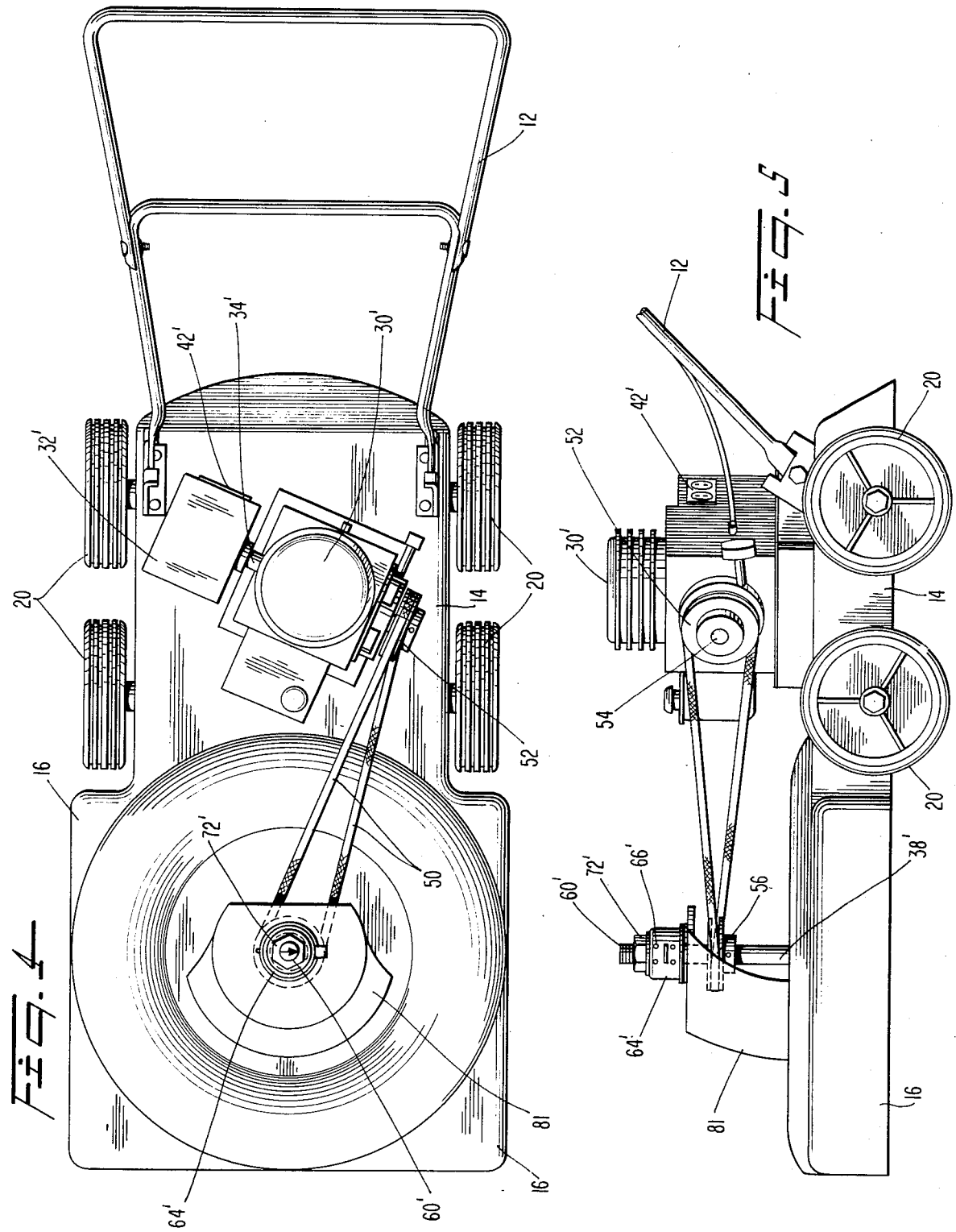

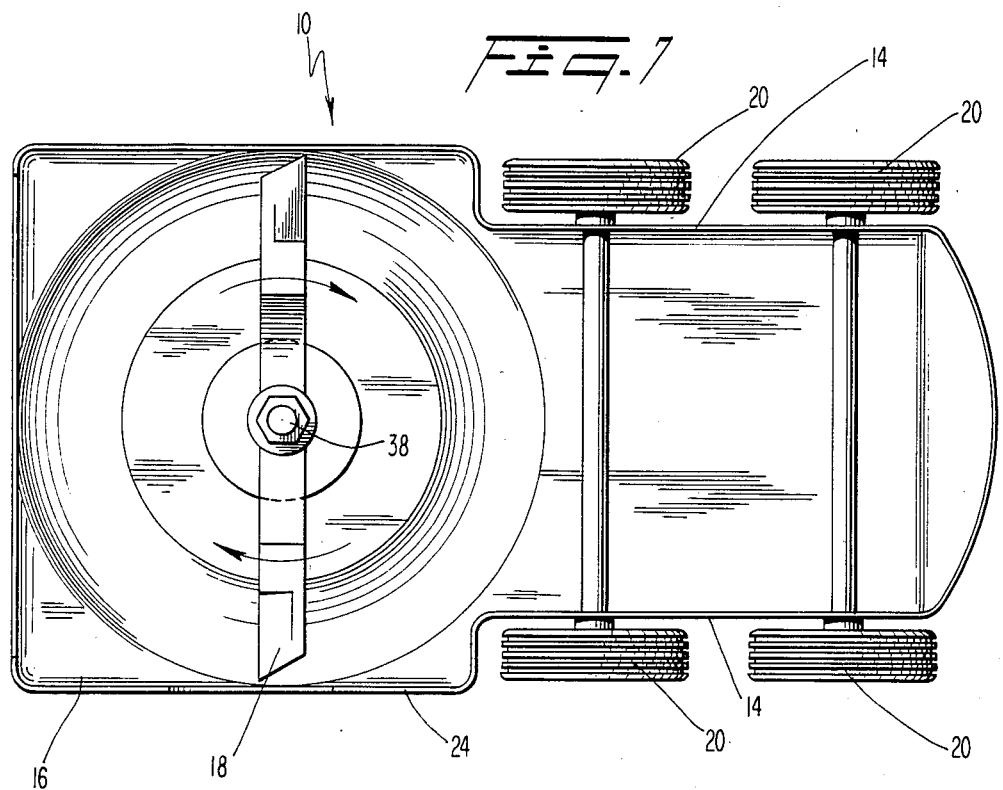
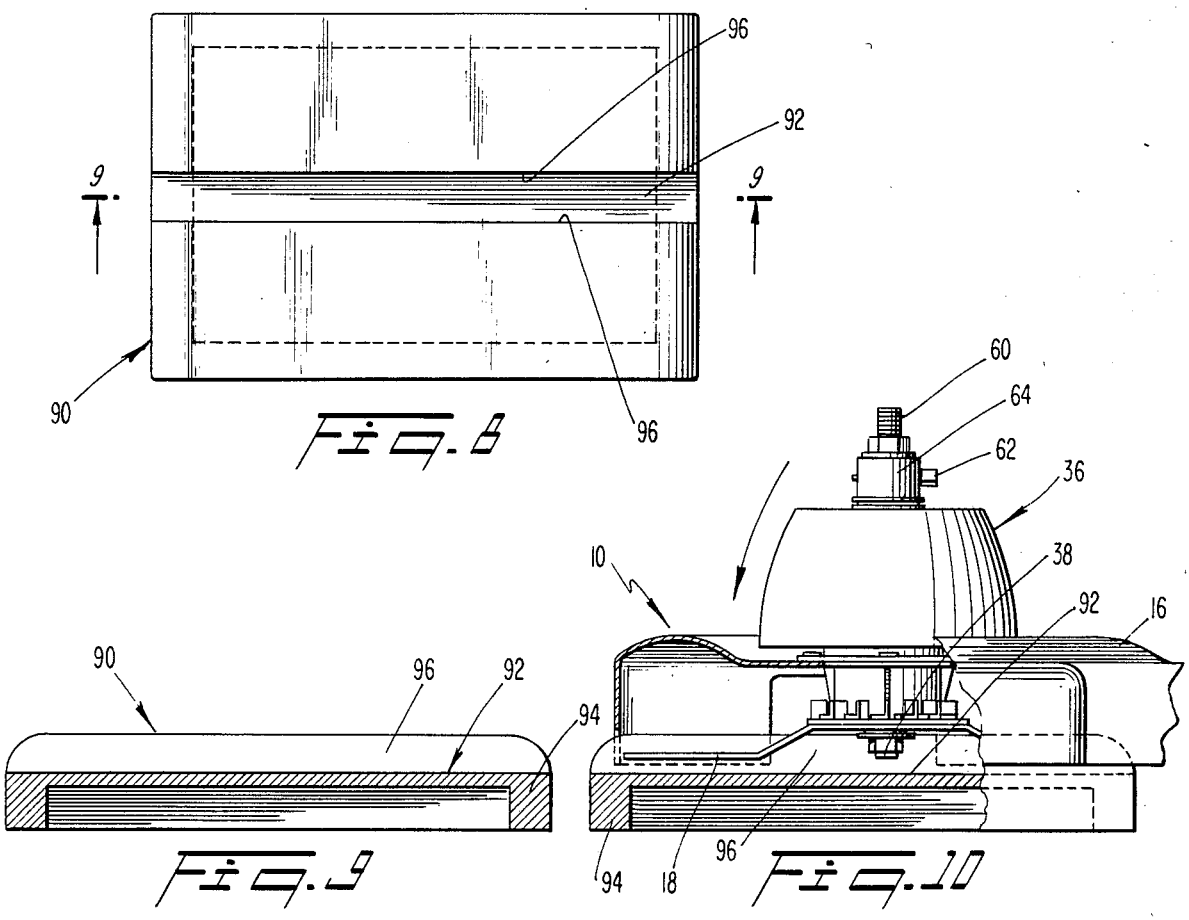

४,५५९,७६८

POWER-DRIVEN LAWNMOWER

BACKGROUND AND OBJECTS OF THE INVENTION

The present invention relates to power lawnmowers.

In the use of power driven, walk-behind types of lawnmowers a user walks behind a wheeled mower having a motor-driven blade and steers the mower by means of a handle. It can, however, be difficult to cut close to an upstanding object such as a wall, for example, due to the presence of the support wheels at the front and sides of the mower housing. Thus, after mowing it is often necessary to follow-up with a trimming implement of some sort, thereby increasing the overall time and effort involved.

It would be desirable, therefore, to enable a mower to cut closer to an upstanding object.

It would also be desirable to enable greater advantage to be made of the horsepower which is readily available on a gasoline engine-powered lawnmower. For example, there exist electrically driven implements which sometimes cannot be employed when electricity is unavailable, such as during electrical outages or where the electrical outlets are too remotely located.

It would also be desirable to simplify the blade-height adjusting operation on a power-driven rotary-type lawnmower.

It is, therefore, an object of the present invention to satisfy the above desires.

Another object is to provide a power driven lawnmower of the walk-behind type which is capable of cutting close to upstanding objects such as walls.

A further object is to enable a gasoline engine-powered lawnmower to generate electricity for driving nonrelated electrically driven implements.

An additional object is to facilitate the blade height adjustment in rotary type powered lawnmowers.

SUMMARY OF THE INVENTION

These objects are achieved by the present invention which relates to a power-driven lawnmower. In one aspect of the present invention, the lawnmower is of the walk-behind type and comprises a housing having front and rear portions. The front portion includes vertical side walls between which a blade is disposed. A handle is mounted on the housing and extends rearwardly therefrom to be gripped by a user. A plurality of ground support wheels are mounted on the housing and all are located at the rear portion of the housing behind the blade and are laterally offset inwardly relative to the blade so that no portion of the wheels extend laterally outwardly or forwardly beyond the blade. Accordingly, the front portion of the housing is able to closely approach upstanding objects.

In another aspect of the present invention, a power-driven lawnmower of the walk-behind type comprises a wheel-supported housing. A cutting blade is rotatably carried by the housing. A power assembly is operably connected to the blade to rotate same. The power assembly comprises a gasoline engine and an electric generator driven by the gasoline engine to produce electrical power. The generator includes a socket configured to receive a multi-pronged electric plug of an external electrically driven implement. The blade can be driven by an electrical motor which is, in turn, driven by the generator. Alternatively, the blade can be mechanically driven by the engine.

In a further aspect of the present invention, a lawnmower comprises a wheeled housing and a vertical blade shaft carried by the housing for rotation about its own longitudinal axis and for vertical sliding movement. A cutting blade is fixedly mounted on a lower end of the shaft. A power mechanism is provided for rotating the shaft and an adjustment mechanism is provided for vertically adjusting the shaft. The adjusting mechanism comprises a vertically stationary sleeve receiving an upper extension of the shaft. Either the sleeve or the extension includes a plurality of vertically spaced holes selectively alignable with a hole carried by the other of the sleeve and extension. A pin is insertable into the aligned holes to retain the shaft at a selected elevation. The sleeve can be mounted for rotation about the axis of the shaft so as to be rotatable with the shaft when the pin is installed, or the sleeve can be non-rotatably mounted, with the shaft being rotatable relative to the sleeve and the pin.

THE DRAWING

The objects and advantages of the invention will become apparent from the following detailed description of preferred embodiments thereof in connection with the accompanying drawings in which like numerals designate like elements, and in which:

FIG. 1 is a top plan view of a lawnmower according to a first embodiment of the present invention;

FIG. 2 is a side elevational view of a lawnmower depicted in FIG. 1;

FIG. 3 is a vertical sectional view taken through the front portion of the housing of the lawnmower depicted in FIGS. 1–2;

FIG. 4 is a top plan view of another embodiment of a lawnmower according to the present invention;

FIG. 5 is a side elevational view of the lawnmower depicted in FIG. 4;

FIG. 6 is a vertical sectional view taken through the front portion of the lawnmower depicted in FIG. 5;

FIG. 7 is a bottom plan view of a lawnmower;

FIG. 8 is a top plan view of a platform employed in a blade-adjusting operation according to the present invention;

FIG. 9 is a vertical sectional view taken along the line 9—9 in FIG. 8;

FIG. 10 is a side elevational view, with portions broken away, depicting a lawnmower housing after it has been lowered onto the platform, with the blade being disposed within a slot of the platform; and FIG. 11 is a cross-sectional view taken along the line 11—11 in FIG. 6.

DETAILED DESCRIPTION OF PREFERRED EMBODIMENTS OF THE INVENTION

In FIGS. 1–3 there is depicted a power driven rotary-type lawnmower 10 of the walk-behind type, wherein a user walks behind and guides the mower by means of a handle 12. The mower includes a housing 14 formed of a strong, rigid material such as steel. The housing includes a front portion 16 on which a rotary blade 18 is mounted, and a rear portion 20 to which a plurality of support wheels 22 are mounted. All of the support wheels 22 are situated rearwardly of the blade 18.

The housing is shaped such that the side walls 26 of the rear portion 20 are offset laterally inwardly relative to the side walls 24 of the front portion 16 by a distance at least equal to the distance by which the wheels 22 project beyond the side walls 26 of the rear portion. Thus, the wheels 22 project no farther laterally outwardly than the side walls 24, and preferably no farther laterally outwardly than the blade 18, whereby the wheels do not affect the proximity to which the blade and side walls 24 may approach an upright object such as a wall, for example. Consequently, the mower is able to cut closer to such an upright object and eliminate or minimize the need to perform a subsequent trimming operation.

Preferably, the wheels 22 are offset slightly laterally inwardly relative to the side walls 24 in order to ensure that the wheels do not interfere with the ability to maneuver the front portion 16 of the housing close to an upright object. Of course, it is propitious to arrange the ends 28 of the blade 18 as closely as possible to the side walls 24 to take full advantage of this mower characteristic.

The side walls 24 may extend downwardly beyond the blade, if desired, or may include movable flaps.

Mounted atop the rear portion 20 of the housing is a gasoline engine 30 which can be of any conventional type. Mounted adjacent the engine 30 is a conventional electric generator 32 which is driven by an output shaft 34 of the engine 30 to generate at least a sufficient amount of electrical power to drive a conventional electric motor 36 mounted atop the front portion 16. The electric motor 36 has a vertical drive shaft 38 which carries the blade 18, which shaft is adjustable as will be discussed hereinafter. An electric cable 40 electrically connects the electric motor 36 to the generator 32.

Carried by the generator 32 are one or more conventional electric outlets or sockets 42 capable of receiving a multi-prong electric plug. The generator is preferably rated at 120 volts to be capable of operating standard types of electrically driven implements. It will be appreciated, then, that the lawnmower 10 constitutes, in effect, a portable electric generator which can operate electrical equipment during periods of power outages, or at locations which are too far from an electrical socket. Thus, the lawnmower can drive external electrically driven plug-in implements such as milking machines, weed trimmers, paint sprayers, and battery chargers, just to name a few.

It is not necessary that the electrical generator 32 by operably connected to an electric motor for driving the blade 18. Rather, the engine 30 can be mechanically coupled in any suitable fashion to the drive shaft, with the generator being provided only for driving external implements during times of need. As depicted in the embodiment of FIGS. 4-6, for example, a belt 50 interconnects the motor 30' with a vertical drive shaft 38'. The belt is driven by a pulley 52 which is drivingly connected to an output shaft 54 of the engine 30 extendng oppositely od the drive shaft 34' which drives the electrical generator 32'. The latter includes an electrical socket 40' for receiving an electrical plug for reasons explained earlier. The belt 50 drives a pulley 56 fixedly coupled to the drive shaft 38' for the mower blade. Other types of mechanical connection between the engine 30' and the blade drive shaft 38' will be possible as is evident to those skilled in the art.

The present invention also envisions a novel means for adjusting the height of a rotary mower blade. In FIG. 3, there is depicted an upwardly directed extension 60 of the blade drive shaft 38. The drive shaft is vertically slidable within the motor 36 and is adjustable at various locations by means of a pin 62. For example, the shaft can have vertical splines which mate with cooperating splines on the motor armature to permit the shaft to slide vertically relative to the armature while being rotatably coupled thereto, as will be evident to those skilled in the art.

A hollow cylindrical sleeve 64 surrounds the extension 60 of the blade drive shaft 38 and is provided with a series of radially extending, vertically spaced through-holes 66. The shaft extension 60 is also provided with a radial through-hole which can be aligned with a selected one of the sleeve through-holes 66 to receive the pin 62 and thereby retain the blade 18 at a desired height. Any suitably shaped pin may be employed, such as a cotter pin, for example, wherein the outer end 68 of the pin 62 can be deformed to prevent inadvertent dislodgement of the pin.

The sleeve 64 is mounted in vertically stationary fashion on a suitable axial bearing 70 disposed atop the motor casing, which permits the sleeve 64 to rotate with the shaft 38. An upper end of the shaft extension 60 is threaded and carries a nut 72 to prevent inadvertent sliding of the shaft extension 60 within the sleeve 64 when the pin 62 is removed. Thus, by removing the pin 62 and rotating the nut 72, the shaft extension 60 can be raised or lowered to the desired elevation.

As an alternative arrangement, the shaft 38 could be provided with a plurality of vertically spaced through-holes, one of which is selectively alignable with a single through-hole formed in the sleeve 64.

In FIGS. 4, 6, 11, a modified blade-height adjusting mechanism is depicted wherein instead of a rotatable sleeve 64, a non-rotatable sleeve 64' is employed which is mounted in a vertically stationary manner on a fixed bracket 81 carried by the mower housing. The sleeve 64' includes vertically spaced pairs of through-holes 66' which are offset relative to the axis of the shaft extension 60', i.e., the through-holes 66' do not intersect that axis. Rather, the through-holes 66' are disposed generally tangentially relative to the outer surface of the shaft extension 60' and intersect the bore 80 of the sleeve 64'. The shaft extension 60' includes a hole in the form of a circumferentially extending annular groove 82 on the outer periphery thereof which can be selectively brought into alignment with each pair of through-holes 66'. The groove 82 is of semi-circular cross-section so that the legs 83 of a U-shaped pin 84 can be inserted through the through-holes 66' and the groove 82 to retain the shaft 38' at a desired elevation. During rotation of the drive shaft 38' the pin 84 and sleeve 64' remain stationary. Suitable fittings can be provided, if desired, for introducing a lubricant into the through-holes. Also, the pin 84 can be provided with a low-friction coating.

Adjusting of the shaft 38' is carried out in a manner similar to that described earlier in connection with FIG. 3, i.e., by rotation of a nut 72'.

During rotation of the nut 72 or 72', it may be necessary to take steps to prevent rotation of the shaft 38 or 38'. One manner of achieving this will be described in connection with FIGS. 8, 9. Depicted therein is a platform 90 having an upwardly open, horizontally extending slot 92. The platform includes ground support legs 94 which position the slot 92 at an elevation suitable for receiving the blade 18 when the lawnmower 10 is positioned over the box. That is, by tilting the housing 12 about the axis of the rearmost wheels 22 so that the front portion 16 of the housing is raised, the lawnmower can be pushed forwardly until the front portion 16 of the housing overlies the platform. By then lowering the housing front portion 16, the blade 18 will enter the slot 92.

Of course, it is necessary to pre-align the blade 18 relative to the slot. This can be accomplished by viewing the blade from beneath the housing and manually rotating same. Alternatively, the top end of the shaft extension 60 can be provided with a reference line which is made to be parallel with the blade. Thus, the shaft can be turned until observed to be aligned with the slot 92.

When the blade is disposed within the slot 92, side walls 96 of the slot 92 will prevent rotation of the blade and shaft so that the nut can be rotated relative to the latter.

From the foregoing, it will be appreciated that a uniquely advantageous lawnmower has been described. By locating all of the wheels rearwardly of the blade and arranging the wheels so as to extend no farther laterally outwardly than the blade, the front portion 16 and blade of the lawnmower can closely approach upstanding objects, such as walls, to eliminate or minimize the need for subsequent trimming therealong.

The presence of an electrical generator 32 and electrical socket 40 enables the lawnmower to supply electricity to external electrically driven implements when conventional sources of electricity are unavailable.

The height adjustment mechanism for the blade shaft is fast, simple and easy to use.

Although the present invention has been described in connection with preferred embodiments thereof, it will be appreciated by those skilled in the art that additions, substitutions, modifications, and deletions, not specifically described may be made without departing from the spirit and scope of the invention as defined in the appended claims.

What is claimed is:

1. A power-driven lawnmower of the walk-behind type comprising:
   a housing having front and rear portions,
      said front portion including vertical side walls,
   a handle mounted on said housing and extending rearwardly therefrom to be gripped by a user,
   a power-driven blade carried by said front portion between said side walls, and
   a plurality of ground support wheels mounted on said housing, said support wheels comprising a pair of laterally spaced and laterally aligned first wheels and at least one additional wheel spaced in a fore-aft direction from said first wheels, all of said first and second wheels being located on said rear portion behind said blade and being laterally offset inwardly relative to said side walls so that no portion of said first and second wheels extends laterally outwardly beyond said side walls or forwardly beyond said blade, in order to enable said front portion to closely approach upstanding objects.

2. A lawnmower according to claim 1, wherein a gasoline powered engine is mounted on said rear portion.

3. A lawnmower according to claim 1, including power means carried by said housing and being operably connected to said blade to rotate same; said power means comprising a gasoline engine and an electric generator driven by said gasoline engine to produce electrical power, said generator including a socket configured to receive a multi-prong electric plug.

4. A lawnmower according to claim 3, wherein said power means includes an electric motor carried by said housing and operably connected to said blade, said generator being electrically connected to said motor independently of said outlet to drive said motor.

5. A lawnmower according to claim 3, wherein said engine is mechanically coupled to said blade to rotate same.

6. A lawnmower according to claim 3 including a vertical shaft mounted for rotation and vertical sliding movement and carrying said blade at a lower end thereof; and adjustment means comprising a vertically stationary sleeve receiving an upper extension of said shaft, one of said sleeve and extension including a plurality of vertically spaced hole means selectively alignable with a hole means carried by the other of said sleeve and extension, and pin means insertable into such aligned hole means to retain said shaft at the selected elevation.

7. A lawnmower according to claim 1 including a vertical shaft mounted for rotation and vertical sliding movement and carrying said blade at a lower end thereof; and adjustment means comprising a vertically stationary sleeve receiving an upper extension of said shaft, one of said sleeve and extension including a plurality of vertically spaced hole means selectively alignable with a hole means carried by the other of said sleeve and extension, and pin means insertable into such aligned hole means to retain said shaft at the selected elevation.

8. A lawnmower according to claim 7, wherein said sleeve is mounted for rotation about the axis of said shaft so as to be rotatable with said shaft with said pin means installed.

9. A lawnmower according to claim 7, wherein said sleeve is non-rotatably mounted, said shaft being rotatable relative to said sleeve and said pin means.

10. A lawnmower according to claim 9, wherein said hole means in said extension includes circumferentially extending, outwardly open groove means, said pin means being U-shaped and including two legs, each leg extending through hole means in said sleeve and through a portion of said groove in said shaft.

11. A lawnmower according to claim 7, wherein said extension is threaded at its upper end, and nut means being threadedly mounted on said threaded extension above said sleeve and adapted to raise and lower said shaft in response to being rotated with said pin means after being removed.

12. A lawnmower according to claim 11 in combination with a separate platform having an upwardly open slot sized to receive said blade to prevent the latter from rotating.

13. A lawnmower according to claim 1, wherein said at least one additional wheel comprises an additional pair of laterally spaced and laterally aligned wheels.

14. A power driven lawnmower of the walk-behind type comprising:
   a wheel-supported housing;
   a cutting blade rotatably carried by said housing; and
   power means operably connected to said blade to rotate same, said power means comprising:
   a gasoline engine, and
   an electric generator driven by said gasoline engine to produce electrical power, said generator including a socket configured to receive a multi-prong electric plug of an external electrically driven implement.

15. A lawnmower according to claim 14, wherein said power means includes an electrical motor carried by said housing and operably connected to said blade, said generator being electrically connected to said motor, independently of said outlet, to drive said motor.

16. A lawnmower according to claim 14, wherein said engine is mechanically connected to said blade to rotate same.

17. A lawnmower according to claim 14 including a vertical shaft mounted for rotation and vertical sliding movement and carrying said blade at a lower end thereof; and adjustment means for vertically adjusting said shaft, said adjustment means comprising a vertically stationary sleeve receiving an upper extension of said shaft, one of said sleeve and extension including a plurality of vertically spaced hole means selectively alignable with a hole means carried by the other of said sleeve and extension, and pin means insertable into such aligned hole means to retain said shaft at the selected elevation.

18. A lawnmower according to claim 17, wherein said sleeve is mounted for rotation about the axis of said shaft so as to be rotatable with said shaft with said pin means installed.

19. A lawnmower according to claim 17, wherein said sleeve is non-rotatably mounted, said shaft being rotatable relative to said sleeve and said pin means.

20. A lawnmower according to claim 19, wherein said hole means in said extension includes circumferentially extending, outwardly open groove means, said pin means being U-shaped and including two legs, each leg extending through hole means in said sleeve and through a portion of said groove in said shaft.

21. A lawnmower according to claim 17, wherein said extension is threaded at its upper end, and nut means being threadedly mounted on said threaded extension above said sleeve and adapted to raise and lower said shaft in response to being rotated after said pin means has been removed.

22. A lawnmower according to claim 21, in combination with a separate platform having an upwardly open slot sized to receive said blade to prevent the latter from rotating.

23. In a lawnmower of the type comprising a wheeled housing, a vertical blade shaft carried by said housing for rotation about its own longitudinal axis and for vertical sliding movement, a cutting blade fixedly mounted on a lower end of said shaft, power means for rotating said shaft, and adjustment means for vertically adjusting said shaft, said adjustment means comprising a vertically stationary sleeve receiving an upper extension of said shaft, one of said sleeve and extension including a plurality of vertically spaced hole means selectively alignable with a hole means carried by the other of said sleeve and extension, and pin means insertable into such aligned hole means to retain said shaft at the selected elevation, said extension being rotatable relative to said inserted pin means about said longitudinal axis during operation.

24. A lawnmower according to claim 23, wherein said hole means in said extension includes circumferentially extending outwardly open groove means.

25. A lawnmower according to claim 24, wherein said pin means is U-shaped and includes two legs, each leg extending through hole means in said sleeve and through a portion of said groove in said shaft.

26. A lawnmower according to claim 23, wherein said extension is threaded at its upper end, and nut means being threadedly mounted on said threaded extension above said sleeve and adapted to raise and lower said shaft in response to being rotated, with said pin means being removed.

27. A lawnmower according to claim 26 in combination with a separate platform having an upwardly open slot sized to receive said blade to prevent the latter from rotating.

28. A power-driven lawnmower of the walk-behind type comprising:
a housing having front and rear portions,
  said front portion including vertical side walls,
a handle mounted on said housing and extending rearwardly therefrom to be gripped by a user,
a power-driven blade carried by said front portion between said side walls,
a plurality of ground support wheels mounted on said housing all being located on said rear portion behind said blade and being laterally offset inwardly relative to said side walls so that no portion of said wheels extends laterally
outwardly beyond said side walls or forwardly beyond said blade, in order to enable said front portion to closely approach upstanding objects, and
power means carried by said housing and being operably connected to said blade to rotate same, said power means comprising
a gasoline engine,
an electric generator driven by said gasoline engine to produce electrical power, said generator including a socket configured to receive a multiprong electric plug, and
an electric motor carried by said housing and operably connected to said blade, said generator being electrically connected to said motor independently of said outlet to drive said motor.

29. A power-driven lawnmower of the walk-behind type comprising:
a wheel-supported housing;
a cutting blade rotatably carried by said housing; and
power means operably connected to said blade to rotate same, said power means comprising:
a gasoline engine,
an electric generator driven by said gasoline engine to produce electrical power, said generator including a socket configured to receive a multiprong electric plug of an external electrically driven implement, and
an electrical motor carried by said housing and operably connected to said blade, said generator being electrically connected to said motor, independently of said outlet, to drive said motor.

* * * * *